United States Patent
Perego et al.

(10) Patent No.: US 6,824,815 B2
(45) Date of Patent: Nov. 30, 2004

(54) PROCESS FOR PRODUCING AN ELECTRICAL CABLE, PARTICULARLY FOR HIGH VOLTAGE DIRECT CURRENT TRANSMISSION OR DISTRIBUTION

(75) Inventors: Gabriele Perego, Milan (IT); Enrico Albizzati, Lesa (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 0 days.

(21) Appl. No.: 10/026,729

(22) Filed: Dec. 27, 2001

(65) Prior Publication Data

US 2002/0127401 A1 Sep. 12, 2002

Related U.S. Application Data

(60) Provisional application No. 60/259,232, filed on Jan. 3, 2001.

(30) Foreign Application Priority Data

Dec. 27, 2000 (EP) .............................. 00128566

(51) Int. Cl.$^7$ ............................ B05D 5/12; H01B 17/22
(52) U.S. Cl. ................ 427/120; 427/117; 174/110 PM; 428/379
(58) Field of Search ................. 427/117, 120, 427/118; 174/110 PM; 428/375, 379

(56) References Cited

U.S. PATENT DOCUMENTS

| 4,048,355 A | * | 9/1977 | Sakayori et al. ............. 427/375 |
| 5,561,185 A | * | 10/1996 | Hashimoto et al. ......... 524/436 |
| 2002/0127401 A1 | * | 9/2002 | Perego et al. ............... 428/375 |

FOREIGN PATENT DOCUMENTS

| EP | 0 463 402 A2 | 1/1992 |
| JP | 5-266724 | 10/1993 |
| JP | 6-215645 | 8/1994 |
| JP | 10-283851 | 10/1998 |
| WO | WO 98/52197 | 11/1998 |

OTHER PUBLICATIONS

U. Sanemori; "Modified Polyethylene Resin Composition"; Patent Abstracts of Japan, of JP 63–130649, Jun. 2, 1988.

(List continued on next page.)

*Primary Examiner*—Rena Dye
*Assistant Examiner*—J. Gray
(74) *Attorney, Agent, or Firm*—Finnegan, Henderson, Farabow, Garret & Dunner, L.L.P.

(57) ABSTRACT

Process for preparing an electrical cable comprising at least one conductor and at least one layer of extruded insulating coating, which includes:

coating, by extrusion, the conductor with a polymeric composition comprising a polyethylene, a radical initiator and at least one unsaturated carboxylic acid of general formula (I) in free form:

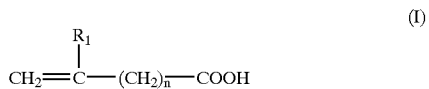

in which:

$R_1$ represents H or $CH_3$;

n represents 0 or 1;

said unsaturated carboxylic acid being present in an amount of between 0.0006% and 0.25% by weight, said amount being expressed as the weight content of —COOH groups relative to the total weight of the polymeric composition;

heating the conductor thus coated so as to obtain cross-linking of said polymeric composition.

14 Claims, 1 Drawing Sheet

OTHER PUBLICATIONS

Y. Katsuhiko; "Ethylenic Resin Composition"; Patent Abstracts of Japan, of JP 03–017142, Jan. 25, 1991.
Y. Yuichi; "DC Power Cable"; Patent Abstracts of Japan, of JP 05–266724, Oct. 15, 1993.
N. Namoru; "Bonding Polyethylene Resin Composition"; Patent Abstracts of Japan, of JP 04–013745, Jan. 7, 1992.
Y. Norihiko; "DC Power Cable"; Patent Abstracts of Japan, 06–215645, Aug. 5, 1994.

* cited by examiner

PROCESS FOR PRODUCING AN ELECTRICAL CABLE, PARTICULARLY FOR HIGH VOLTAGE DIRECT CURRENT TRANSMISSION OR DISTRIBUTION

CROSS REFERENCE TO RELATED APPLICATIONS

This application claims the benefit of U.S. Provisional Application No. 60/259,232, filed Jan. 3, 2001, the content of which is incorporated herein by reference, and claims the right to priority based on European Application No. 00128566.7, filed Dec. 27, 2000.

BACKGROUND OF THE INVENTION

1. Field of the Invention

The present invention relates to a process for producing an electrical cable, particularly for high voltage direct current transmission or distribution.

More particularly, the present invention relates to a process for preparing an electrical cable, particularly for high voltage direct current transmission or distribution, which is suitable for either terrestrial or submarine installation, comprising the stage of producing at least one insulating coating for said cable by hot cross-linking of a polymeric composition comprising a polyethylene, a radical initiator and a small amount of an unsaturated carboxylic acid.

The present invention moreover relates to a cable for high voltage direct current transmission or distribution in which the insulating coating consists of the abovementioned polymeric composition.

For the purposes of the present description and the claims, the term "high tension" means a tension of greater than 35 kV.

2. Description of the Related Art

The cables generally used for high voltage direct current transmission, either along terrestrial lines or, particularly, along submarine lines, are cables commonly known in the art, such as mass-impregnated cables in which the conductor, coated with a first semiconducting layer, is electrically insulated by being wound with an insulating material, generally paper or paper/polypropylene/paper multilayer laminates, which is then totally impregnated with a mixture with high electrical resistivity and high viscosity, generally a hydrocarbon oil containing a viscosity-increasing agent. The cable then comprises a further semiconducting layer and a metal screen, generally made of lead, which is itself surrounded by at least one metal armouring structure and by one or more plastic protective sheaths.

Although mass-impregnated cables are characterized by high reliability in operation even at very high voltages (greater than 150 kV), they have a number of drawbacks mainly associated with migration of the insulating fluid inside the cable. Particularly, during use, the cable is subjected, owing to variations in the intensity of the current transmitted, to thermal cycles which cause migrations of the fluid in the radial direction. As a matter of fact, when the current carried increases and the cable heats up, the viscosity of the insulating fluid decreases and the fluid is subjected to a thermal expansion greater than all the other components of which the cable is made. This leads to migration of the fluid from the insulating layer towards the exterior and, consequently, to an increase in the pressure exerted on the metal screen, which is deformed in the radial direction. When the current carried decreases and the cable cools down, the impregnating fluid contracts, whereas the metal screen, which is made of a plastic material (usually lead), remains permanently deformed. This therefore results in a decrease in the internal pressure of the cable, leading to the formation of microcavities in the insulating layer with a consequent risk of electric discharges and, hence, of perforation of the insulation. The risk of perforation increases as the thickness of the insulating layer increases and, hence, as the maximum voltage for which the cable was intended increases.

Another solution for high voltage direct current transmission consists of cables with fluid oil, in which the insulation is provided by a pressurized oil of low viscosity and high electrical resistivity (under a hydrostatic head). Although this solution is highly effective in terms of avoiding the formation of microcavities in the cable insulation, it has a number of drawbacks mainly associated with the complexity of construction and, particularly, results in a limitation of the maximum permissible length of the cable. This limitation of the maximum length is a major drawback, especially as regards submarine use, in which the lengths required are usually very great.

For many years, research has been directed towards the possibility of using cross-linked polyolefins, and particularly cross-linked polyethylene (XLPE), to produce insulating materials for cables for direct current transmission. Insulating materials of this type are already widely used in the case of cables for alternating current transmission. The use of said insulating materials also in the case of cables for direct current transmission would allow said cables to be used at higher temperatures, for example at 90° C. instead of 50° C., compared with the mass-impregnated cables described above (higher working temperatures, making it possible to increase the amount of current transported) and would eliminate limitations in the maximum permissible length of the cable, in contrast with the cables containing fluid oil described above.

However, it has not hitherto been possible to adequately and fully exploit said insulating materials, particularly for direct current transmission. It is commonly believed that one of the main reasons for this limitation is the development and accumulation of so-called space charges in the dielectric insulating material when said material is subjected to a direct current. It is thought that space charges alter the distribution of the electrical field and persist for long periods on account of the high resistivity of the polymers used. The accumulation of space charges leads to a local increase in the electrical field, which is consequently greater than that which would be expected considering the geometrical dimensions and the dielectric properties of the insulating material.

The accumulation of space charges is a slow process: however, the problem is accentuated when the direct current transported by the cable is reversed (in other words, if there is a reversal of polarity). As a result of this reversal, a capacitive field is superimposed on the whole electrical field and the value of the maximum gradient can be localized within the insulating material.

It is known that a prolonged degassing treatment, which may be carried out, for example, by subjecting the insulating material based on a cross-linked polymer to high temperatures and/or to a high vacuum for a long period, makes it possible to obtain an insulating material which is capable of limiting the accumulation of space charges when the cable is subjected to polarity reversal. In general, it is thought that, by virtue of the removal of the decomposition products of the cross-linking agent (for example dicumyl peroxide which forms acetophenone and cumyl alcohol on decomposition) from the insulating material, said degassing treatment reduces the formation of space charges. However, a prolonged degassing treatment obviously leads to an increase in the production times and costs.

In efforts to reduce the accumulation of space charges, it is known practice to modify cross-linked polyethylene (XLPE) by introducing small amounts of polar groups.

Patent application EP-A-0 463 402 discloses an ethylene (co)polymer containing polar groups chosen from ketone, nitrile and nitro groups in an amount of between 20 ppm and 8000 ppm, said polar groups having a dipole moment of greater than 0.8 debye. Said (co)polymer is said to be usable as an insulating material for high voltage cables with improved dielectric rigidity. Said polar groups may be introduced into the polyethylene by various processes such as, for example:

by copolymerization of a comonomer containing said polar groups with ethylene;

by blending an ethylene polymer or copolymer containing said polar groups with a conventional polyethylene;

by oxidation of a conventional polyethylene;

by grafting comonomers containing said polar groups onto a conventional polyethylene.

Japanese patent application JP 10/283 851 discloses a cable for direct current transmission which has improved dielectric rigidity, in the presence of polarity reversals or following applications of electrical pulses, in which the insulating coating consists of a polymeric composition comprising a cross-linked polyolefin containing (i) a dicarboxylic acid anhydride and (ii) at least one monomer containing a polar group (chosen from at least one carbonyl, nitrile or nitro group). A particular peroxide, more specifically 2,5-dimethyl-2,5-di(t-butylperoxy)hexane, and a particular antioxidant, more specifically a thiocarboxylic acid ester, are required. Said groups (i) and (ii) can be introduced into the polyethylene by various processes such as, for example:

by copolymerizing a comonomer containing said groups with an olefin (for example ethylene);

by grafting said groups onto a polyolefin;

by blending polyolefins modified by grafting with the above groups (i) and/or (ii) with a polyolefin as such.

The abovementioned composition is prepared by mixing the peroxide, the antioxidant and the modified polyolefin according to one of the abovementioned processes and by heating to bring about the cross-linking.

Japanese patent application JP 06/215 645 discloses a cable for high voltage direct current transmission which shows a reduced accumulation of space charges. The insulating coating is prepared by hot cross-linking of a blend of a polyethylene, an organic peroxide having a half-life at 130° C. of greater than 5 hours and an acid chosen from itaconic acid and crotonic acid in an amount of less than 5 parts by weight per 100 parts by weight of polyethylene.

Japanese patent application JP 05/266 724 discloses a cable for high voltage direct current transmission with a reduced accumulation of space charges. The insulating coating is prepared by:

adding to the polyethylene a compound chosen from, for example, vinyl acetate, benzoic acid, naphthoic acid, acrylic acid; or hot cross-linking of a blend of polyethylene, an organic peroxide having a half-life at 130° C. of greater than 5 hours and a compound chosen, for example, from vinyl acetate, benzoic acid, naphthoic acid, acrylic acid.

Said compound is present in an amount of up to 10 parts by weight per 100 parts by weight of polyethylene.

As mentioned above, some of the known prior art solutions concerning insulating coatings, particularly insulating coatings for cables for high voltage direct current transmission with a reduced accumulation of space charges, envisage the use of cross-linked polyolefins, particularly cross-linked polyethylene, which have been modified beforehand by introducing polar monomers by means of copolymerization or pre-grafting. The Applicant believes that, when the polyolefins are modified by copolymerization, the introduction of the polar monomer presents a number of difficulties due to the fact that said polar monomer tends to form blocks and is therefore not evenly distributed along the polymer chain. When the polyolefins are modified by pre-grafting with said polar monomers using a radical initiator (for example an organic peroxide), since it is necessary to work at low concentrations of said radical initiator so as to avoid scorching of the polyolefin, said monomers have a tendency to homopolymerize. The presence of homopolymers may give rise to zones rich in polar domains which promote the accumulation of space charges.

Other solutions instead propose to carrying out hot cross-linking of a composition comprising polyethylene as such, an organic peroxide and a compound containing polar groups. However, the Applicant believes that, in this case also, a number of problems may be encountered since, by working as disclosed in the abovementioned prior art, besides the problems associated with the formation of homopolymers, the insulating coating thus obtained may contain unreacted compounds which are difficult to remove by the usual degassing techniques since they are, for example, relatively non-volatile. Also the presence of unreacted compounds may have an adverse effect on the properties of the insulating coating thus obtained by promoting the accumulation of space charges.

The Applicant has also found that the use of excessive amounts of compounds containing polar groups, instead of reducing the accumulation of space charges, has a tendency to increase said accumulation, thus reducing the electrical performance qualities of the cable thus obtained.

SUMMARY OF THE INVENTION

The Applicant has therefore found that there is a need to improve the process for producing the insulating coating for cables, particularly the insulating coating for cables for high voltage direct current transmission or distribution which have a reduced accumulation of space charges. More particularly, the Applicant has found that there is a need to work under conditions such as to avoid the formation of homopolymers and the accumulation of unreacted compounds during the abovementioned process.

The Applicant has now found that it is possible to obtain an insulating coating for an electrical cable, particularly for high voltage direct current transmission or distribution, which has a reduced accumulation of space charges and which is suitable for both terrestrial and submarine installation, by hot cross-linking a polymeric composition comprising a polyethylene, a radical initiator and a small amount of an unsaturated carboxylic acid as defined hereinbelow. The use of small amounts of said unsaturated carboxylic acid makes it possible to obtain a good grafting rate without giving rise to the abovementioned phenomena of homopolymerization or of persistence of unreacted compounds which would tend to promote the accumulation of space charges. As a matter of fact, when a small amount of unreacted unsaturated carboxylic acid remains, this may readily be removed by the usual degassing techniques.

In a first aspect, the present invention relates to a process for preparing an electrical cable, particularly for high voltage direct current transmission or distribution, comprising at least one conductor and at least one layer of extruded insulating coating, which includes:

coating, by extrusion, the conductor with a polymeric composition comprising a polyethylene, a radical initiator and at least one unsaturated carboxylic acid of general formula (I) in free form:

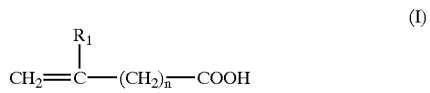

(I)

in which:
$R_1$ represents H or $CH_3$;
n represents 0 or 1;
said unsaturated carboxylic acid being present in an amount of between 0.0006% and 0.25% by weight, preferably between 0.02% and 0.15% by weight, said amount being expressed as the weight content of —COOH groups relative to the total weight of the polymeric composition;

heating the conductor thus coated so as to obtain cross-linking of said polymeric composition.

The radical initiator is present in the abovementioned polymeric composition in an amount such that cross-linking of the polyethylene is obtained after heating. Particularly, the amount of radical initiator used for the purposes of the present invention is between 0.5 and 5 parts by weight per 100 parts by weight of the polymeric composition, preferably between 1.5 and 3 parts by weight per 100 parts by weight of the polymeric composition.

In the present description and in the claims which follow, the abovementioned definition "unsaturated carboxylic acid of general formula (I) in free form" means that the carboxylic acid has not been introduced beforehand into the polyethylene by copolymerization or pre-grafting.

In the present description and in the claims which follow, the term "conductor" means a conductive element as such, of elongate shape and preferably made of a metal material, or a conductive element coated with a semiconducting layer. As will be specified more clearly hereinbelow, the latter solution, which envisages the use of a semiconducting layer on both the inside and outside of the insulating coating, is typically used for electrical cables.

In a second aspect, the present invention relates to an electrical cable, particularly for direct current transmission or distribution, obtained according to the process described above.

In a further aspect, the present invention relates to an electrical cable, particularly for high voltage direct current transmission or distribution, comprising at least one conductor and at least one extruded insulating coating layer consisting of a polymeric composition comprising a polyethylene grafted with at least one unsaturated carboxylic acid of general formula (I):

(I)

in which:
$R_1$ represents H or $CH_3$;
n represents 0 or 1;

said unsaturated carboxylic acid being present in an amount of between 0.0006% and 0.25% by weight, preferably between 0.02% and 0.15% by weight, said amount being expressed as the weight content of —COOH groups relative to the total weight of the polymeric composition.

In a further aspect, the present invention relates to a polymeric composition comprising a polyethylene, a radical initiator and at least one unsaturated carboxylic acid of general formula (I) in free form:

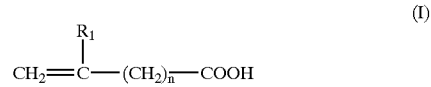

(I)

in which:
$R_1$ represents H or $CH_3$;
n represents 0 or 1;
said unsaturated carboxylic acid being present in an amount of between 0.0006% and 0.25% by weight, preferably between 0.02% and 0.15% by weight, said amount being expressed as the weight content of —COOH groups relative to the total weight of the polymeric composition.

According to a first preferred embodiment, the unsaturated carboxylic acid of general formula (I) is added to the polyethylene in the form of granules (pre-impregnation of the polyethylene granules).

Said first embodiment may be carried out using a device which is suitable for treating granules of a polymer material with small amounts of liquid, working in batchwise or continuous mode, preferably in continuous mode. To this end, for example, a turbomixer (such as a LICO type device) may be used, which, by virtue of its high spin speed of between 500 rpm and 5000 rpm, allows said carboxylic acid to be distributed quickly and very efficiently over the surface of the polyethylene granules. The flow of said granules and the flow of said liquid are controlled by load cells and their ratio is kept constant automatically, by means of a control unit. The polyethylene granules thus treated may be conveyed directly to the extruder feed opening, or may be sent to a digester in which said granules are left for the time required for the carboxylic acid to be absorbed: they are generally left for a period of less than 5 minutes, at 20° C. Said digester, which may optionally be the actual loading hopper of the extruder, may operate at a temperature of between 20° C. and 90° C., preferably between 40° C. and 70° C. Total absorption of the carboxylic acid added makes it possible to obtain both better distribution of this acid in the polyethylene and better stability of the extrusion parameters since the extruder is fed with dry granules.

According to a second preferred embodiment, the unsaturated carboxylic acid of general formula (I) is added to the polyethylene directly in the extruder cylinder. To this end, the carboxylic acid is thus injected by means of a suitable pump directly into the extruder cylinder. The injection may take place in an initial zone of the extruder cylinder in which the polyethylene is still in solid form, or may take place in a subsequent zone in which the polyethylene is in molten form.

The subsequent cross-linking stage is carried out according to techniques usually used for cross-linking polyethylene as such. To this end, the cross-linking is carried out via a radical route by means of thermal decomposition of the radical initiator, which is preferably an organic peroxide, this material being absorbed onto the polyethylene before extrusion or injected directly into the extruder cylinder, working as described above for the unsaturated carboxylic acid of general formula (I).

The extrusion temperature for the material which constitutes the insulating coating layer is kept below the decomposition temperature of the radical initiator used. For example, when dicumyl peroxide is used, the extruder temperature is kept at about 130° C. to avoid scorching of the insulating material.

The subsequent cross-linking is carried out at a temperature above the decomposition temperature of the radical initiator; for example, again in the case in which dicumyl peroxide is used, said temperature is between 180° C. and 280° C.

The extrusion is advantageously carried out in a single pass, for example by means of the "tandem" technique, in which individual extruders arranged in series are used, or by means of co-extrusion with a multiple-extrusion head.

During the subsequent cross-linking, the unsaturated carboxylic acid of general formula (I) is grafted to the polyethylene in grafting yields of between 80% and 100%. If unreacted polar monomer residues remain, said residues may be readily removed by degassing.

According to a preferred embodiment, the polyethylene (PE) is an ethylene homopolymer or a copolymer of ethylene with at least one α-olefin having a density of between 0.860 g/cm$^3$ and 0.940 g/cm$^3$, preferably between 0.865 g/cm$^3$ and 0.930 g/cm$^3$.

For the purposes of the present description and the claims, the term "α-olefin" means an olefin of general formula $CH_2=CH—R'$ in which R' represents a linear or branched alkyl group containing from 1 to 10 carbon atoms. The α-olefin may be chosen, for example, from: propylene, 1-butene, 1-pentene, 4-methyl-1-pentene, 1-hexene, 1-octene, 1-dodecene, and the like. The following are preferred: 1-butene, 1-hexene and 1-octene. The amount of α-olefin optionally present is generally between 0.5 mol % and 15 mol %, preferably between 1 mol % and 10 mol %.

The polyethylene is preferably chosen from: medium density polyethylene (MDPE) having a density of between 0.926 g/cm$^3$ and 0.940 g/cm$^3$; low density polyethylene (LDPE) and linear low density polyethylene (LLDPE) having a density of between 0.910 g/cm$^3$ and 0.926 g/cm$^3$.

According to a preferred embodiment, the unsaturated carboxylic acid of general formula (I) is chosen from: acrylic acid and vinyl acetic acid. Acrylic acid is particularly preferred.

According to a preferred embodiment, the radical initiator is an organic peroxide. Specific examples of organic peroxides that are useful for this purpose include: dicumyl peroxide, t-butylcumyl peroxide, 2,5-dimethyl-2,5-di(t-butylperoxy)hexane, di-t-butyl peroxide, and the like. Dicumyl peroxide is particularly preferred.

The polymeric composition described above may optionally comprise an effective amount of one or more conventional additives such as, for example, antioxidants, processing co-adjuvants, lubricants, pigments, water-tree retardants, voltage stabilizers, anti-scorching agents, and the like.

Antioxidants generally useful for this purpose include: 4,4'-thiobis (6-t-butyl-m-cresol) (known under the trade name Santonox® TBMC from Flexsys), tetrakis[3-(3,5-di-t-butyl-4-hydroxyphenyl)propionyl-oxymethyl]methane (known under the trade name Irganox® 1081 from Ciba), 2,2'-thiobis(4-methyl-6-t-butylphenol) (known under the trade name Irganox® 1081 from Ciba), 2,2'-thiodiethylenebis[3-(3,5-di-t-butyl-4-hydroxy-phenyl) propionate] (known under the trade name Irganox® 1035 from Ciba) and thiocarboxylic acid esters, or mixtures thereof.

BRIEF DESCRIPTION OF THE DRAWING

The attached

With reference to FIG. 1, the cable 1 according to the present invention comprises in sequence, from the centre outwards: a conductor 2, an inner semiconducting layer 3, an insulating coating layer 4, an outer semiconducting layer 5, a metal screen 6 and an outer sheath 7.

Figure 1:
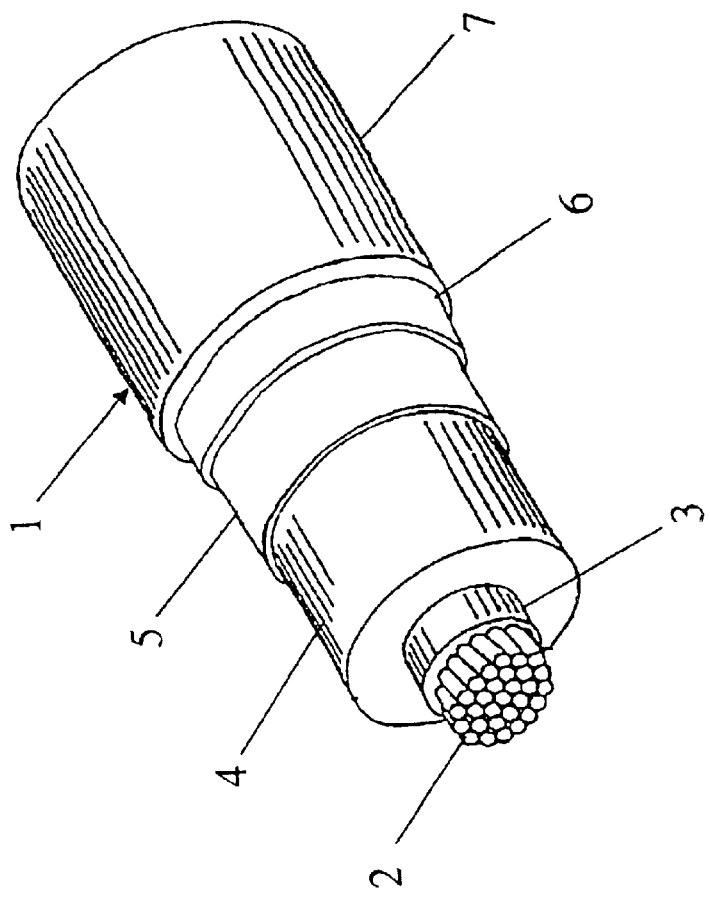
FIG. 1 illustrates one embodiment of the cable according to the present invention, and particularly shows, in perspective view, a section of cable with parts removed step by step to demonstrate its structure.

The conductor 2 generally consists of metal wires, preferably copper and aluminium wires, stranded together according to conventional techniques. The inner and outer semiconducting layers 3 and 5, generally consisting of a polyolefin-based polymeric composition containing a conductive filler (for example carbon black), are extruded over the conductor 2, separately or together with the insulating coating layer 4 according to the present invention. Around the outer semiconducting layer 5 is usually placed a screen 6, generally consisting of electrically conductive wires or tapes, wound helically. This screen is then covered with a sheath 7, consisting of a thermoplastic material, for example non-cross-linked polyethylene (PE) or, preferably, a propylene homopolymer or copolymer.

The cable may moreover be provided with an outer protective structure (not represented in FIG. 1) which serves mainly to protect the cable against mechanical impacts and/or compression. This protective structure may be, for example, a metal armouring or a layer of expanded polymeric material as disclosed in patent application WO 98/52197.

FIG. 1 shows only one possible embodiment of a cable according to the present invention: it goes without saying that changes known in the art may be made to this embodiment without thereby departing from the scope of the present invention.

Although the present description is mainly directed towards the preparation of electrical cables for high voltage electrical power transmission or distribution, the process according to the present invention may be used to produce insulating coating for electrical devices in general. Particularly, it may be used to produce components of accessories used in the production of electrical lines such as, for example, elastic sleeves for terminals or joints.

The present invention is now further described in the example which follows, which is given purely for illustrative purposes and should not be considered as limiting the invention in any way.

EXAMPLE 1

99.82 g of low density polyethylene (LDPE LE 4201 S from Borealis, containing 2.1% by weight of dicumyl peroxide) and 0.18 g of acrylic acid (Fluka) were introduced into a 200 ml round-bottomed flask with stirring.

The temperature was then raised to 50° C. and the mixture was maintained at this temperature, with stirring, for three hours until the acrylic acid was completely absorbed.

By working as described above, the following mixtures were prepared:
  99.64 g of low density polyethylene (LDPE LE 4201 S from Borealis, containing 2.1% by weight of dicumyl peroxide) and 0.36 g of acrylic acid (Fluka);
  99.50 g of low density polyethylene (LDPE LE 4201 S from Borealis, containing 2.1% by weight of dicumyl peroxide) and 0.50 g of acrylic acid (Fluka).

Films were prepared from the mixtures thus obtained, by press-moulding at 130° C. followed by cross-linking at 180° C.

The moulding conditions were as follows:

dimensions of the mould: 20×20 cm;

pressure: 170 bar;

amount of material: 4.5 g;

thermoforming temperature: 130° C.;

duration of thermoforming: 5 min;

cross-linking temperature: 180° C.;

cross-linking time: 30 min;

cooling time: 30 min.

The films obtained as described above had dimensions of 20×20 cm and a thickeness of about 120 $\mu$m.

Samples of 7×7 cm dimensions were cut from the above-mentioned films and subjected to an electrical ageing test in the presence of polarity reversal: the results obtained are given in Table 1. Samples with the same polyethylene without addition of acrylic acid were produced, as described above, for comparative purposes.

The test was carried out as follows.

The abovementioned samples were placed between two stainless steel electrodes having a Rogowski profile, immersed in a silicone oil so as to prevent external discharges during the test, and a direct-current electric field equal to 20 kV with positive polarity was applied. After 1 hour, the polarity was reversed and the operation was continued in this manner for 6 hours.

The test was repeated, increasing the electric field to 25 kV and reversing the polarity every hour, for 6 hours, as described above.

The lifetimes equivalent to a voltage gradient equal to 216 kV/mm were calculated from the data obtained from the tests carried out on 8 samples by subjecting said data to Weibull processing, assuming a life n equal to 12: the results are given in Table 1.

TABLE 1

| MATERIAL | % BY WEIGHT OF —COOH GROUPS | LIFETIME AT 216 kV/mm (hours) |
|---|---|---|
| XPLE | — | 1.20 |
| XPLE-g-AA* (0.18% by weight) | 0.11 | 23.40 |
| XPLE-g-AA* (0.36% by weight) | 0.22 | 3.80 |
| XPLE-g-AA* (0.50% by weight) | 0.31 | 1.30 |

AA*: acrylic acid

EXAMPLE 2

A high voltage cable prototype was produced, in which the insulating coating layer consisted of a polymeric composition according to the present invention.

The cable was prepared by co-extrusion of the three layers, using a three-head extruder, i.e. three separate extruders opening into a single extrusion head, so as to obtain the co-extrusion of the semiconductor coatings and of the insulating coating.

Thus, an aluminium conductor (consisting of a plurality of aluminium wires stranded together to form a cross section of about 70 mm$^2$), was coated on the extrusion line with an inner semiconducting coating 0.5 mm thick comprising ethylene/butyl acrylate and carbon black.

A 45 mm single-screw Bandera extruder, of configuration 20D, provided with four zones of heat regulation by using diathermic oil, was used to deposit said inner semiconducting coating. Over said inner semiconducting coating was extruded an insulating coating 5.5 mm thick comprising low density polyethylene (LDPE LE 4201 S from Borealis) added with 0.18% by weight of acrylic acid. The addition was carried out by injecting the acrylic acid into the extruder opening, using a previously calibrated Ismatec piston pump, at a rate so as to give the desired concentration equal to 0.18% by weight.

A 100 mm single-screw Bandera extruder, in configuration 25D, provided with five zones of heat regulation by using diathermic oil and having the following temperature profile: from 115° C. to 125° C. in the cylinder, 115° C. on the collar and 115° C. in the head, was used to deposit said inner insulating coating.

An outer semiconducting coating 0.5 mm thick having the same composition as the inner semiconducting coating described above was then extruded in a position radially external to said insulating coating.

A 60 mm single-screw Bandera extruder, in configuration 20D, provided with five zones of heat regulation by using diathermic oil, was used to deposit said outer semiconducting coating.

The extrusion line had a speed of 2 m/min.

A thin slice equal to about 150 $\mu$m thick of the cable thus obtained was cut off, using a microtome, and was then placed in an oven at 80° C. until the cross-linking by-products had been completely removed.

The sample thus obtained was characterized by infrared spectroscopy (FTIR), on a pre-calibrated machine, using the ratio between the band at 1710 cm$^{-1}$ (acrylic acid) and the band at 1377 cm$^{-1}$ (polyethylene). The measurement was repeated, after treating the sample in a Soxhlet extractor with chloroform for 24 hours, so as to remove the ungrafted reaction products and obtain the grafting yield, which was equal to 85%.

What is claimed is:

1. A process for preparing an electrical cable comprising at least one conductor and at least one layer of extruded insulating coating, comprising:

a) coating, by extrusion, the conductor with a polymeric composition comprising a polyethylene, a radical initiator and at least one unsaturated carboxylic acid of general formula (I) in free form:

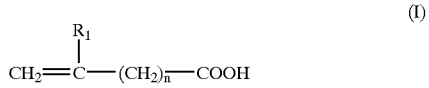

(I)

in which:

$R_1$ represents H or $OH_3$;

n represents 0 or 1;

said unsaturated carboxylic acid being present in an amount of between 0.0006% and 0.25% by weight, said amount being expressed as the weight content of —COOH groups relative to the total weight of the polymetric composition; and b) heating the conductor thus coated so as to obtain cross-linking of said polymeric composition.

2. A process according to claim 1, wherein the unsaturated carboxylic acid of general formula (I) is present in an amount of between 0.02% and 0.15% by weight, said amount being expressed as the weigh content of —COOH groups relative to the total weight of the polymeric composition.

3. A process according to claim 1, wherein the radical initiator is present in an amount of between 0.5 and 5 parts by weight per 100 parts by weight of the polymeric composition.

4. A process according to claim 3, wherein the radical initiator is present in an amount of between 1.5 and 3 parts by weight per 100 parts by weight of the polymeric composition.

5. A process according to claim 1, wherein the unsaturated carboxylic acid of general formula (I) is added to the polyethylene in the form of granules.

6. A process according to claim 1, wherein the unsaturated carboxylic acid of general formula (I) is mixed with the polyethylene directly in an extruder cylinder.

7. A process according to claim 1, wherein the polyethylene is an ethylene homopolymer or a copolymer of ethylene with at least one $\alpha$-olefin having a density of between 0.860 g/cm$^3$ and 0.940 g/cm$^3$.

8. A process according to claim 7, wherein the $\alpha$-olefin is an olefin of general formula $CH_2=CH-R$ in which R represents linear or branched alkyl group containing from 1 to 10 carbon atoms.

9. A process according to claim 8, wherein the $\alpha$-olefin is chosen from propylene, 1-butene, 1-pentene, 4-methyl-1-pentene, 1-hexene, 1-octene or 1-dodecene.

10. A process according to claim 1, wherein the polyethylene is chosen from medium density polyethylene having a density of between 0.926 g/cm$^3$ and 0.940 g/cm$^3$; low density polyethylene or linear low density polyethylene having a density of between 0.910 g/cm$^3$ and 0.926 g/cm$^3$.

11. A process according to claim 1, wherein the radical initiator is an organic peroxide.

12. A process according to claim 11, wherein the organic peroxide is chosen from dicumyl peroxide, t-butylcumyl peroxide 2,5-dimethyl-2,5-di (t-butyl-peroxy) hexane or di-t-butyl peroxide.

13. A process according to claim 11, wherein the unsaturated carboxylic acid of general formula (I) is chosen from acrylic acid or vinyl acetic acid.

14. A process according to claim 13, wherein the unsaturated carboxylic acid of general formula (I) is acrylic acid.

* * * * *

UNITED STATES PATENT AND TRADEMARK OFFICE
CERTIFICATE OF CORRECTION

PATENT NO. : 6,824,815 B2
DATED : November 30, 2004
INVENTOR(S) : Gabriele Perego et al.

It is certified that error appears in the above-identified patent and that said Letters Patent is hereby corrected as shown below:

Title page,
Item [74], *Attorney, Agent or Firm*, "Garret" should read -- Garrett --.

Column 10,
Line 53, "$OH_3$;" should read -- $CH_3$; --.
Line 59, "polymetric" should read -- polymeric --.
Line 65, "weigh" should read -- weight --.

Column 11,
Line 21, "represents linear" should read -- represents a linear --.

Signed and Sealed this

Tenth Day of May, 2005

JON W. DUDAS
*Director of the United States Patent and Trademark Office*